Figure 1:
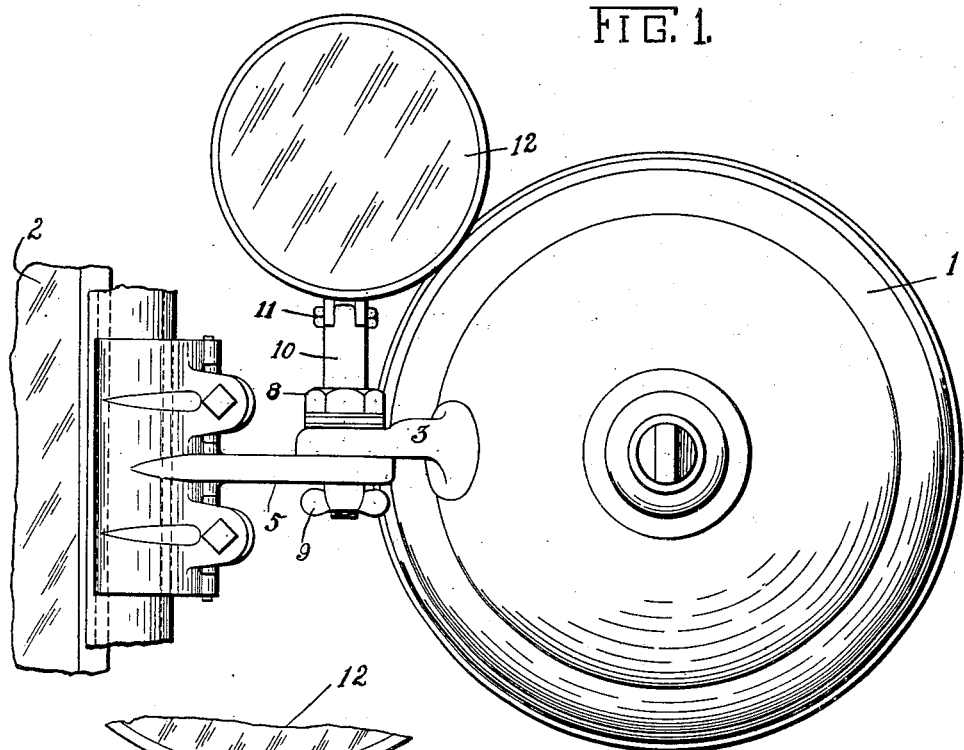

E. A. HAWTHORNE.
VEHICLE LAMP.
APPLICATION FILED JUNE 26, 1916.

1,205,625.

Patented Nov. 21, 1916.

Inventor
Ellsworth A. Hawthorne
By Ellis Spear Jr.
Attorney

UNITED STATES PATENT OFFICE.

ELLSWORTH A. HAWTHORNE, OF BRIDGEPORT, CONNECTICUT.

VEHICLE-LAMP.

1,205,625.  Specification of Letters Patent.  Patented Nov. 21, 1916.

Application filed June 26, 1916. Serial No. 105,788.

*To all whom it may concern:*

Be it known that I, ELLSWORTH A. HAWTHORNE, a citizen of the United States, residing at Bridgeport, county of Fairfield, State of Connecticut, have invented certain new and useful Improvements in Vehicle-Lamps, of which the following is a specification.

This invention relates to vehicle lights of the class known as spotlights, and which are adapted to be clamped to the windshield or at any other convenient place on an automobile or other vehicle in universally adjustable relation thereto, whereby it may be manipulated to project a beam of light in any desired direction. The bracket for thus mounting the lamp usually consists of two overlapping arms pivoted to each other at their overlap, whereby to allow the lamp turning movement about a horizontal axis, each arm engaging respectively the lamp and the windshield. I have found that the mirror usually employed to show the driver traffic approaching from the rear may be conveniently mounted at said connection, thereby securing the advantage of the universal joint connection without necessitating that the lamp be moved from its forwardly directing position in order to position the mirror to effectively show the traffic approaching from the rear. Heretofore where the mirror has been mounted on the lamp, the structure has been open to the disadvantage that when the lamp is swung to a position in which it will illuminate the road ahead the mirror is thereby moved out of operative position and is no longer effective to perform its function of showing traffic approaching from the rear. Moreover, when the mirror has been properly positioned to perform its reflecting functions, the lamp itself has been necessarily swung askew. This is objectionable in that the lamp so positioned could not be used to illuminate the road ahead and in that the position of the lamp detracted from the appearance of the car. Moreover when so positioned the mirror is exposed and liable to breakage.

According to my invention the support for the mirror is mounted through the connection of the lamp and clamp carrying arms of the bracket so as to be partially protected by the lamp and to be disposed between the lamp and the windshield. This allows the mirror to be turned independently of the turning of the lamp bracket, thus enabling the mirror to be always positioned for use irrespective of the position of the lamp with reference to its illuminating functions and obviating the necessity for swinging the lamp at an angle to the car in order to position the mirror in its effective reflecting relation. In addition to this adjustment, the mirror is reversible with respect to the lamp, thus adapting it for use on either side of the windshield according to whether the car has right or left hand control, and always disposing the mirror between the lamp and the windshield. The mirror itself is pivoted to the upper end of its support to enable it to be tilted with reference to the horizontal.

The construction and operation of my device are fully described in the specification which follows.

In the drawings accompanying this specification I have shown a practical embodiment of my invention.

Figure 2:
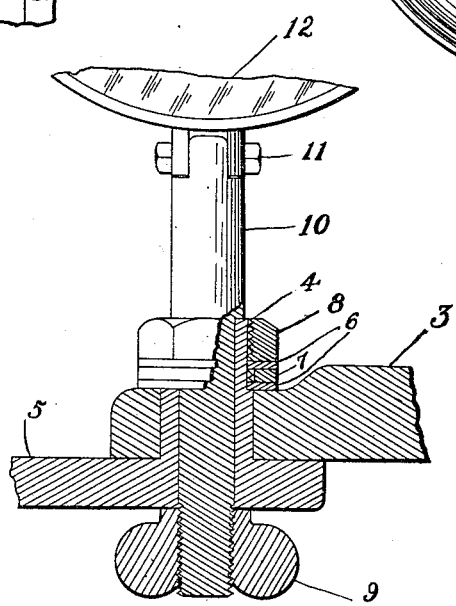

Throughout the specification and drawings like reference numerals are applied to indicate corresponding parts, and in the drawings: Figure 1 is a rear elevation of a spotlight equipped with my mirror and shown in applied position on a windshield. Fig. 2 is an enlarged partial section through the bracket particularly illustrating the manner of mounting my mirror.

The lamp supporting bracket of my invention allows the lamp 1 universal adjusting movement with relation to the windshield 2. Said bracket consists of a horizontal arm 3 having one end swiveled to the lamp to permit the lamp turning movement about a vertical axis. The opposite end of the arm 3 has a hole therein through which passes the reduced and threaded upturned extension 4 of a clamp carrying arm 5, said extension being held to said arm by a pair of plain washers 6, a lock washer 7 and a check nut 8 threaded on said extension. The extension 4 allows the lamp to swivel about a horizontal axis.

Mounted through the bore of the extension 4 and held therein by a suitable wing nut 9 is a mirror supporting stem 10 to the upper end of which is pivoted at 11 a mirror 12. The mirror may therefore be adjusted independently of the lamp about a horizontal axis, or may be tilted with reference thereto at the pivotal connection 11.

Where the lamp is mounted on a car having right hand control, as shown in the drawings, the lamp supporting bracket is clamped to the right hand edge of the windshield and the mirror is disposed between the lamp and the windshield so as to be protected by the lamp. Where the car has left hand control and it is therefore desirable to position the lamp on the left hand edge of the windshield, the lamp is inverted and attached to said left hand side of the windshield and the mirror supporting stem 10 is withdrawn from the bearing 4, inverted, and then replaced in said lug so as to position the mirror in the relation shown in the figures of the drawing, as they now stand. This enables the mirror to have a constant position with reference to the lamp and windshield irrespective of the side of the windshield to which the lamp is fastened.

Inasmuch as the support for the mirror is not fastened on the lamp itself and has adjustment independently of the adjustment of the lamp through its supporting bracket, the mirror may always be positioned to show traffic approaching from the rear irrespective of the adjustment of the lamp supporting bracket and without necessitating that the lamp be swung out of the longitudinal line of the car as is necessary where the mirror is rigidly carried by the lamp.

Various modifications in the form and construction of my invention may obviously be resorted to if within the limits of the appended claims.

What I therefore claim and desire to secure by Letters Patent is:

1. In combination, a lamp, a bracket for mounting said lamp in universally adjustable relation to a windshield, and a mirror mounted on said bracket between the lamp and the windshield so as to be guarded and protected thereby and adjustable independently of the adjustment of the lamp.

2. In combination, a lamp, a bracket for mounting said lamp in universally adjustable relation to a windshield, and a mirror reversibly and invertibly mounted on said bracket between the lamp and the windshield so as to be guarded and protected thereby and adjustable independently of the adjustment of the lamp.

3. In combination, a lamp, a bracket comprising a windshield engaging arm and a lamp carrying arm swiveled to each other, and a mirror mounted on said bracket at said swivel connection.

4. In combination, a lamp, a bracket comprising a windshield engaging arm and a lamp carrying arm swiveled to each other, a stem disposed through said swivel connection, and a mirror on said arm.

5. In combination, a lamp, a bracket comprising a windshield engaging arm and a lamp carrying arm swiveled to each other, a stem disposed through said swivel connection, and a mirror pivoted on said stem.

6. In combination, a lamp, a bracket comprising a windshield engaging arm and a lamp carrying arm, one of said arms having an opening therein, and the other arm having a bored extension disposed through and held in said opening, a stem reversibly disposed through the bore of said extension, and a mirror carried by said stem.

7. In combination, a lamp, a bracket for adjustably mounting said lamp on a support including a support engaging arm and a lamp carrying arm extending toward each other from opposite directions and operatively connected with each other at their adjacent ends, and a mirror carried by said bracket at the connection of said arms with each other.

In testimony whereof I affix my signature in presence of two witnesses.

ELLSWORTH A. HAWTHORNE.

Witnesses:
E. HORACE HAWTHORNE,
E. STEWART HAWTHORNE.